United States Patent [19]

Hunnicutt et al.

[11] 4,454,933
[45] Jun. 19, 1984

[54] DISC BRAKE

[75] Inventors: Harry A. Hunnicutt, Cedarburg; James A. Buckley, Milwaukee, both of Wis.

[73] Assignee: Kelsey Hayes Company, Romulus, Mich.

[21] Appl. No.: 258,067

[22] Filed: Apr. 27, 1981

[51] Int. Cl.³ ............................................. F16D 65/56
[52] U.S. Cl. .................................. 188/71.9; 188/72.7; 188/196 D; 192/111 A
[58] Field of Search ..................... 188/71.8, 71.9, 72.7, 188/196 D, 106 F; 192/111 A

[56] References Cited

U.S. PATENT DOCUMENTS

| | | | |
|---|---|---|---|
| 3,115,217 | 12/1963 | Butter | 188/71.9 |
| 3,365,031 | 1/1968 | Swift | 188/106 F X |
| 4,180,146 | 12/1979 | Airheart | 188/71.9 X |
| 4,278,152 | 7/1981 | Tosi | 188/71.9 |

FOREIGN PATENT DOCUMENTS 1478442  3/1967  France ............................ 188/106 F Primary Examiner—George E. A. Halvosa
Attorney, Agent, or Firm—Ralph J. Skinkiss; Ronald W. Wangerow; David L. Kuhn

[57] ABSTRACT

A disc brake having an improved automatic adjustment mechanism is disclosed. The preferred brake includes a rotary actuating assembly for axially translating a push rod which abuttingly urges a pair of friction element assemblies into engagement with a rotatable disc. A nonrotatable element of the actuating assembly threadably engages the push rod, such that when the push rod is rotated, it is axially advanced to decrease the friction element clearance. A clutch mechanism circumscribes the push rod and communicates, by way of a lost motion connection, with a rotatable element of the actuating assembly to effect rotation of the push rod after a predetermined rotation of the rotatable element. Thus, clearance adjustments are made in response to predetermined wear of the friction elements, thereby maintaining brake clearance within predetermined limits.

3 Claims, 10 Drawing Figures

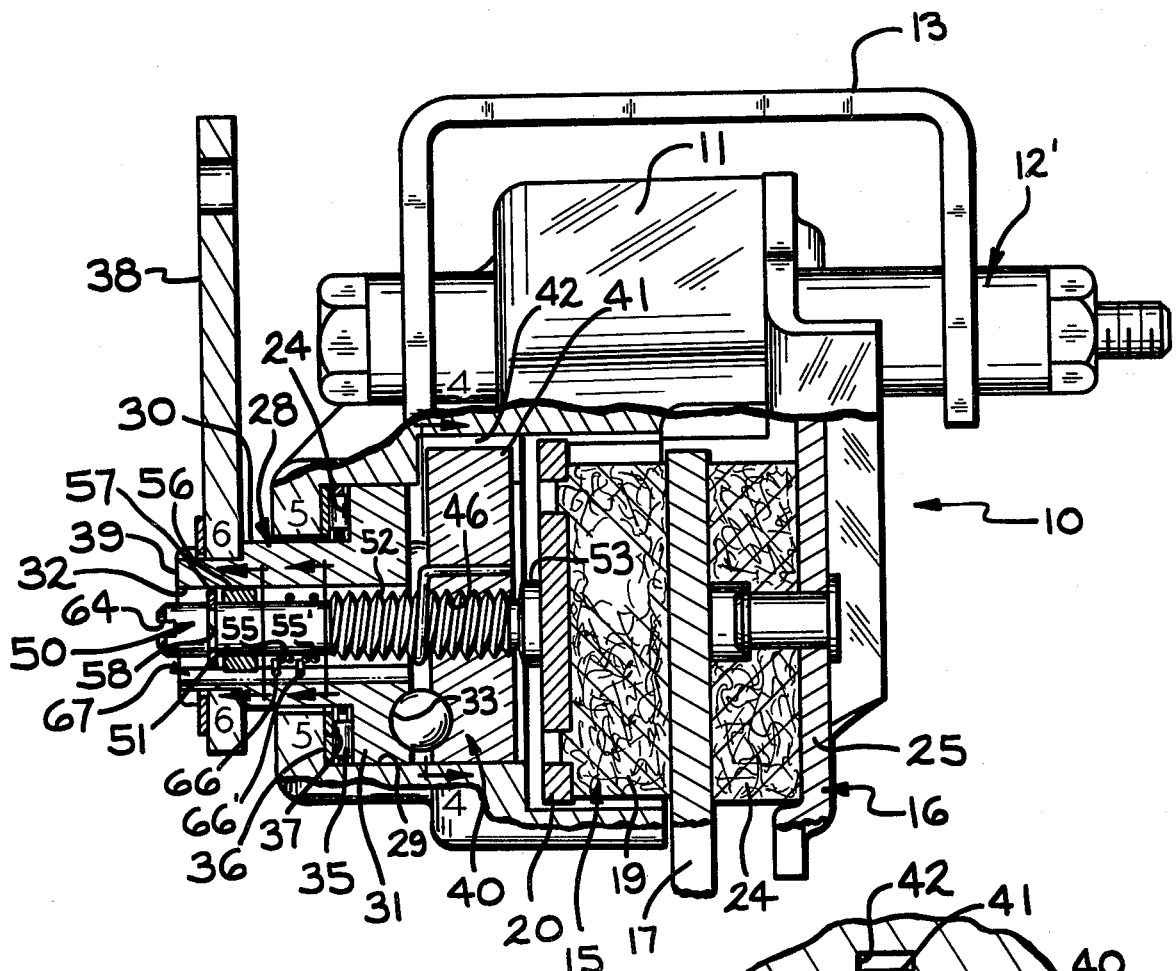
FIG. 3
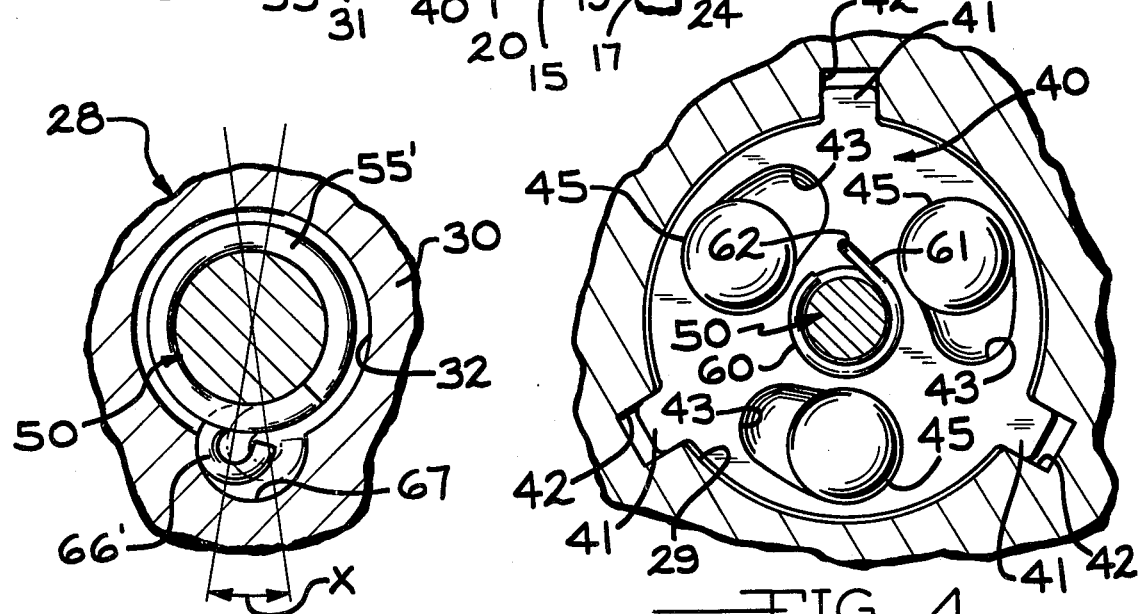
FIG. 5
FIG. 4

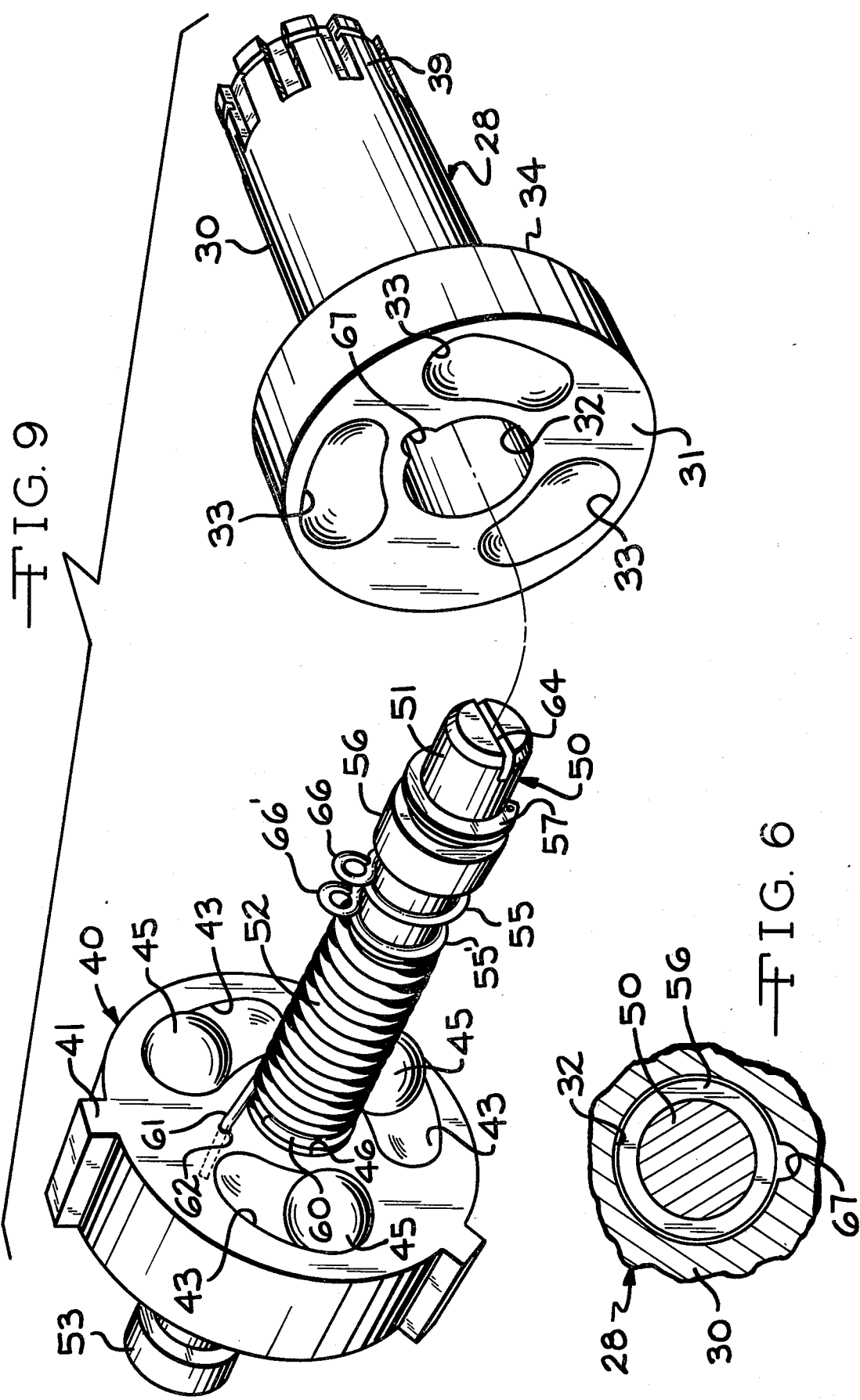

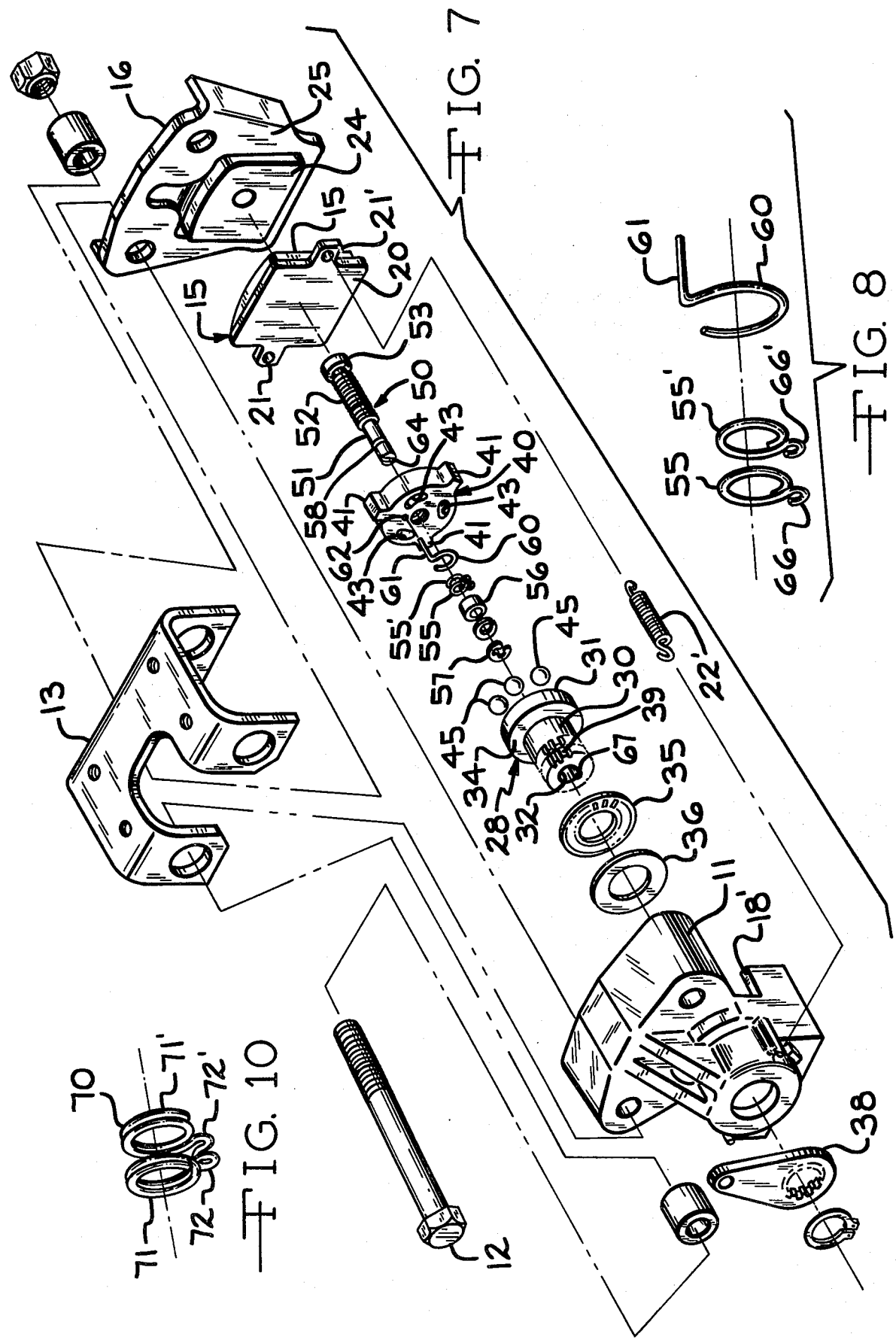

DISC BRAKE

BACKGROUND OF THE INVENTION

1. Field of the Invention

The invention relates to an improved disc brake for vehicles such as snowmobiles, off-road utility vehicles, or agricultural vehicles, and for machinery driveshaft braking systems. More particularly, the invention relates to automatic adjustment apparatus for such disc brakes.

2. Description of the Prior Art

Prior art disc brakes of the type described above frequently include a push rod that translates in an axial direction to urge friction elements into frictional engagement with a rotor. The push rod in such brakes is typically threaded externally and has a rotatable annular nut threaded thereon. The annular nut and push rod assembly is generally urged in a brake-applying axial direction by a rotatable actuating member actuated by the operator through a linkage mechanism.

Such prior art brakes are adjusted by rotating the annular nut with respect to the push rod in response to excessive friction element wear, thereby axially advancing the push rod relative to the annular nut. Rotation of the annular nut is typically accomplished by a ratchet assembly between the rotatable actuating member and the annular nut. The ratchet assembly effects rotation of the annular nut after a predetermined over-rotation of the actuating member resulting from excessive clearance between the friction elements and the rotor.

Prior art disc brakes employing ratchet-type adjustment assemblies perform brake adjustments only after the friction elements have worn sufficiently to cause a pawl to advance to the next tooth on the ratchet wheel. Thus, such adjustment assemblies typically allow too much friction element wear to occur before an adjustment is made. Ratchet-type adjustment assemblies also require too great a stroke of the actuating member in order to function. Finally, the ratchet assembly typically must be at least partially disassembled before manually retracting the push rod in order to install new friction elements.

SUMMARY OF THE INVENTION

According to the present invention, an improved disc brake preferably includes a rotatable cam member and a non-rotatable cam member both circumscribing a push rod communicating with friction element assemblies. The push rod protrudes through a bore extending axially through the rotatable cam member. The non-rotatable cam member threadably engages the push rod so that rotation of the rotatable cam member causes the combination of the non-rotatable cam member and the push rod to axially translate in a forward brake-applying direction, thereby urging the friction element assemblies into frictional engagement with a rotor or disc.

The brake includes automatic adjustment apparatus for maintaining the clearance between the friction element assemblies and the rotor within predetermined limits. Brake adjustment is accomplished by rotating the push rod relative to the non-rotatable member, such that the push rod is axially advanced in the forward direction, in response to friction element wear in excess of said predetermined limits. A clutch assembly between the rotatable cam member and the push rod effects rotation of the push rod after a predetermined rotation of the rotatable cam member.

The preferred clutch assembly includes a one-way helical clutch spring circumscribing the push rod and communicating with the rotatable cam member. The clutch spring is wound such that when the rotatable cam member is rotated in a brake-applying rotary direction, the clutch spring slips and rotates relative to the push rod which is restrained from rotation in such brake-applying rotary direction. Upon counter-rotation of the rotatable cam member to release the brake, the clutch spring clutchingly rotates the push rod relative to the non-rotatable cam member, thereby indexing the push rod in the forward axial direction.

The preferred clutch spring includes at least one tang protruding radially into an axially-extending slot in the rotatable cam member. Preferably the circumferential width of the slot is wider than that of the tang such that the clutch spring is rotated relative to the push rod after a predetermined rotation of the rotatable cam member.

The automatic adjustment mechanism preferably includes a bushing circumscribing the push rod and juxtaposed within the axially-extending bore in the rotatable cam member. The bushing serves to coaxially align the push rod within the bore, thereby maintaining a consistent positioning of clutch assembly's tang relative to the axial slot in the rotatable cam member.

In the preferred embodiment, a one-way spring brake is anchored to the nonrotatable cam member and circumscribes the threads on the push rod. The spring brake clutchingly engages the threads to resist rotation of the push rod as the clutch spring is rotated on the push rod during application of the brake. Upon counter-rotation of the rotatable cam member and clutch spring, the spring brake allows the push rod to be counter-rotated with the rotatable cam member and indexed in the forward axial direction.

The preferred disc brake also includes a torque-transmitting surface on an end of the push rod such that a torque tool may be inserted into an opening in the rotatable cam member to allow manual adjustment of the brake or retraction of the push rod during brake maintenance.

BRIEF DESCRIPTION OF THE DRAWINGS

FIG. 3 is a right side elevational view of the disc brake of FIG. 1 with portions broken away in cross-section.

FIG. 4 is an enlarged cross-sectional view taken along line 4—4 of FIG. 3.

FIG. 5 is an enlarged cross-sectional view taken along line 5—5 of FIG. 3.

FIG. 6 is an enlarged cross-sectional view taken along line 6—6 of FIG. 3.

FIG. 7 is an exploded perspective view of the disc brake of FIG. 1.

FIG. 8 is a perspective view of the preferred clutch spring and the anti-rotation spring components of the disc brake of FIG. 1.

FIG. 9 is a partially exploded perspective view of the actuating and adjustment assembly of the disc brake of FIG. 1.

FIG. 10 is a perspective view of an alternate embodiment of the clutch spring component of the disc brake of FIG. 1.

DETAILED DESCRIPTION OF THE PREFERRED EMBODIMENT

Figure 1:
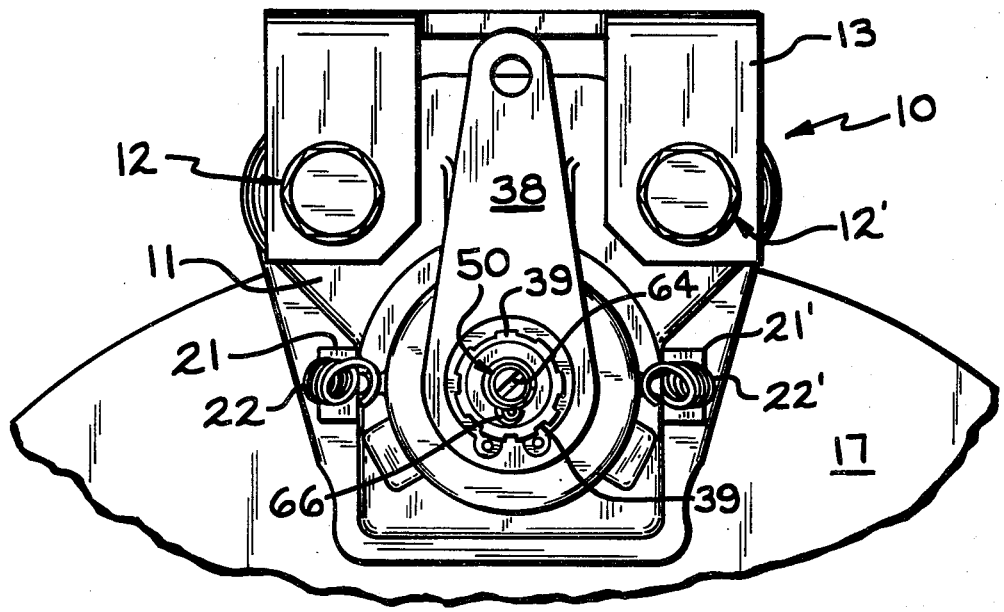
FIG. 1 is an end elevational view of a preferred disc brake embodying the principles of the present invention.
Figure 2:
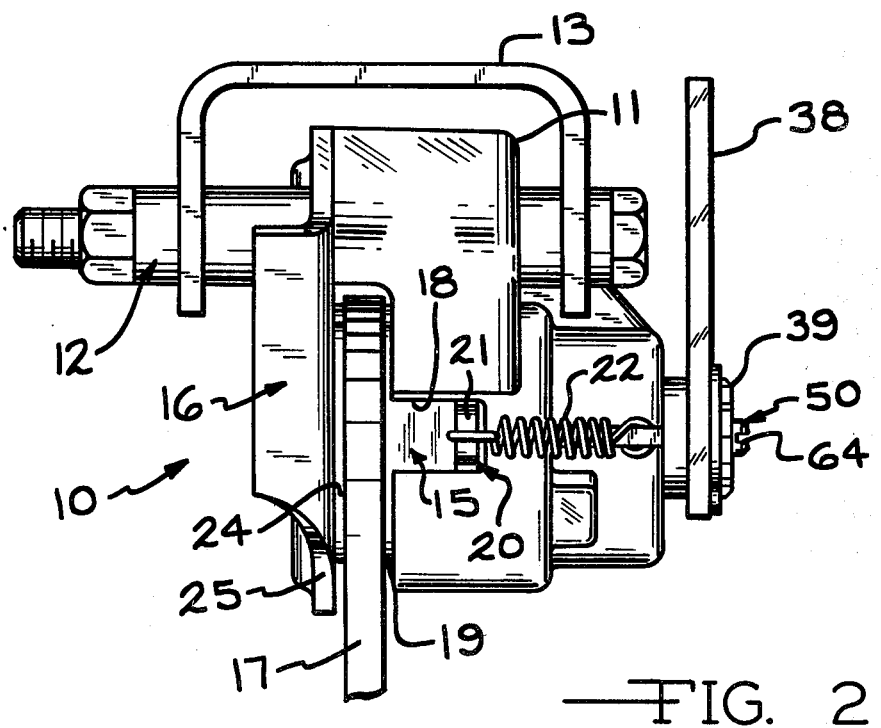
FIG. 2 is a left side elevational view of the disc brake of FIG. 1.

Referring to the drawings, FIGS. 1 through 3 illustrate a disc brake 10 embodying the principles of the present invention. Disc brake 10 includes housing 11 slidably supported by pin assemblies 12 and 12'. Pin assemblies 12 and 12' are in turn supported by anchor member 13, which is secured to a vehicle (not shown).

Friction assemblies 15 and 16 are axially spaced on the inboard and outboard sides, respectively, of rotor or disc 17 which is mounted for rotation on an axle or shaft (not shown). Inboard friction assembly 15 includes friction element 19 fixed to backing plate 20. Backing plate 20 has tabs 21 and 21' slidably carried by slots 18 and 18' (not shown) in housing 11 and held in place by return springs 22 and 22', respectively, which bias inboard friction assembly 15 in an inboard direction. Outboard friction assembly 16 includes friction element 24 secured to backing plate 25, which is slidably carried by pin assemblies 12 and 12'.

Referring to FIGS. 3 through 9, rotatable acutuating member 28 is received for rotation in stepped bore 29 of housing 11. Rotatable actuating member 28 has a shaft portion 30 and a radial flange portion 31, with bore 32 and slot 67 extending axially therethrough. Flange portion 31 includes ball ramp surfaces 33 on its outboard side and thrust surface 34 on its inboard side. Thrust bearing 35 and thrust washer 36 are also received within stepped bore 29 between thrust surface 34 of actuating member 28 and step 37 of housing 11. Shaft portion 30 protrudes axially in an inboard direction from housing 11 and includes splined portion 39 interconnected with actuating lever 38.

FIGS. 1 through 10 of the drawings show a disc brake embodying the present invention that is actuated by rotation of actuating lever 38 in a clockwise direction as viewed in FIG. 1. Such a disc brake is depicted in the drawings and discussed herein for purposes of illustration only, as the invention is not limited to a disc brake whose components are oriented for clockwise direction. One skilled in the art will readily recognize that the principles of the present invention are equally applicable to a disc brake having its components configured for actuation of the brake upon counterclockwise of actuating lever 38.

Stator 40 is axially movable within stepped bore 29 but is rotationally fixed by stator tangs 41 which protrude from the periphery of stator 40 and engage elongated axial slots 42 in housing 11. Stator 40 includes ball ramp surfaces 43 on its inboard side, for receiving balls 45 therein, and threaded aperture 46 extending axially therethrough.

Push rod 50 includes shaft portion 51 extending through bore 32 of actuating member 28, threaded portion 52 threadably engaging threaded aperture 46 of stator 40, and abutment end 53 abuttingly engaging backing plate 20 of friction assembly 15. Push rod 50 preferably includes torque-transmitting surface 64 for receiving a torque tool. Although torque-transmitting surface 64 is depicted in the drawings as a slot for receiving a screwdriver, other known torque transmitting surfaces and torque tools may alternatively be employed.

Clutch springs 55 and 55' circumscribe and frictionally engage shaft portion 51 of push rod 50. Bushing 56 rotatably circumscribes shaft portion 51 of push rod 50 and is retained by snap ring 57 which engages groove 58 in the periphery of shaft portion 51. Clutch springs 55 and 55' preferably include tangs 66 and 66', respectively, which are slidably received in slot 67 of actuating member 28. As is illustrated in FIG. 5, the circumferential width of slot 67 is greater than that of tangs 66 and 66' such that actuating member 28 may freely rotate a predetermined angle X before tangs 66 and 66' contact the sides of slot 67. An alternate embodiment of preferred clutch springs 66 and 66' is illustrated in FIG. 10 as clutch spring 70. Clutch spring 70 is a single-element, continuous spring having two wrap portions 71 and 71' at its opposite ends and a mid portion forming two tangs 72 and 72' interposed therebetween.

As viewed from the left-hand side of FIGS. 7 and 8, preferred clutch springs 55 and 55' are wound in a spiral configuration, beginning at tangs 66 and 66' and extending clockwise in an outboard direction around shaft portion 51 of push rod 50. Because of their configuration, clutch springs 55 and 55' tend to expand diametrically when rotated clockwise relative to push rod 50, thereby being free to slidingly rotate on shaft portion 51. When rotated counterclockwise, however, clutch springs 55 and 55' tend to constrict diametrically, thereby clutchingly engaging shaft portion 51 in order to rotationally drive push rod 50.

In the preferred embodiment, antirotation spring 60 circumscribes threaded portion 52 of push rod 50 adjacent the inboard side of stator 40. Anchor arm 61 extends in an outboard axial direction from antirotation spring 60 and protrudes into anchor hole 62 on stator 40. Antirotation spring 60 spirals clockwise in an inboard direction from anchor arm 61, as viewed from the left-hand side of FIGS. 7 and 8. Thus, when push rod 50 is rotated in a counterclockwise direction, antirotation spring 60 tends to expand diametrically to slidingly allow push rod 50 to rotate. An attempt to rotate push rod 50 in the clockwise direction, however, causes antirotation spring 60 to constrict diametrically and clutchingly engage the threads of threaded portion 51, thereby resisting such clockwise rotation of push rod 50. The interplay of antirotation spring 60 and clutch springs 55 and 55', functioning as opposing one-way spring brakes, is essential to the performance of the self-adjustment mechanism of the brake as will become evident in the following description of the operation of disc brake 10.

In the operation of disc brake 10, actuating lever 38 is rotated in a clockwise direction, as viewed in FIG. 1, thereby causing actuating member 28 is also rotate in a clockwise direction. The rotation of actuating member 28 causes balls 45 to roll up ball ramp surfaces 33 of actuating member 28 and into the shallow ends of ball ramp surfaces 43 of stator 40, thereby urging the combination of stator 40 and push rod 50 in an outboard axial direction. The outboard axial movement of push rod 50 exerts an axial force on backing plate 20 of inboard friction assembly 15, thereby urging friction element 19 into frictional engagement with the inboard side of disc 17. The reactive force of thrust surface 34 of actuating member 28 against thrust bearing 35 and thrust washer 36 is transmitted through housing 11 and pin assemblies 12 and 12' to urge outboard friction assembly 16 in an inboard axial direction, thereby urging friction element 24 into frictional engagement with the outboard side of disc 17. The frictional engagement of friction assemblies 19 and 24 serves to slow, and eventually halt, the rotation of disc 17.

Upon release of actuating lever 38, actuating member 28 rotates counterclockwise, and balls 45 return to the deeper portions of ball ramp surfaces 33 and 43 of actuating member 28 and stator 40, respectively, thus relaxing the axial forces on friction assemblies 15 and 16, respectively. Return springs 22 and 22' retract inboard friction assembly 15 in an inboard direction, biasing backing plate 20 into an abutting engagement with the outboard end of push rod 50.

As friction elements 19 and 24 wear, their clearance with disc 17 increases. Consequently, a greater amount of rotation of actuating member 28 is required to urge friction assemblies 15 and 16 into frictional engagement with disc 17. In such a situation, actuating member 28 rotates through angle X in FIG. 5, thereby taking up the lost motion clearance between the sides of slot 67 in actuating member 28, and tangs 66 and 66' of clutch springs 55 and 55', respectively.

So long as the rotation of actuating member 28 does not exceed the predetermined angle X, no adjustment for friction element wear occurs. However, once the brake clearance exceeds a predetermined level, actuating member 28 rotates through an angle greater than angle X and causes clutch springs 55 and 55' to slip and rotate in a clockwise direction on shaft portion 51 of push rod 50.

Clutch springs 55 and 55' are wound in a direction such as to allow them to slip and rotate on shaft portion 51 only in a clockwise direction. Antirotation spring 60 is wound in a direction such that it frictionally resists rotation of push rod 50 only in a clockwise direction. Therefore, when actuating member 28 rotates in a blockwise direction through an angle greater than angle X, clutch springs 55 and 55' are rotated to a new circumferential position on shaft portion 51 of push rod 50.

When the brake is released, actuating member 28 rotates and drives clutch springs 55 and 55' in a counterclockwise direction, causing clutch springs 55 and 55' to constrict and frictionally engage shaft portion 51, thereby rotating push rod 50 in a counterclockwise direction in a slipping engagement with antirotation spring 60. Since stator 40 is held in a rotationally fixed position, push rod 50 advances axially in the outboard direction as it rotates due to the threaded engagement of threaded aperture 46 with threaded portion 52. As push rod 50 advances, it urges inboard friction assembly 15 toward rotor 17, thereby decreasing the brake clearance to a predetermined desired level.

Extensive testing of early prototype brakes has revealed that inconsistent and unpredictable brake adjustments result if shaft portion 51 of push rod 50 is not held in an axially concentric position relative to bore 32 of actuating member 28. Axial misalignment of push rod 50 can occur upon brake application as a result of clearance in the threads between threaded portion 52 of push rod 50 and threaded aperture 46 of stator 40 or as a result of a bending moment applied to push rod 50 when the friction assemblies are urged into engagement with rotor 17. Tangs 66 and 66' of clutch springs 55 and 55' have a generally rounded lateral profile, and slot 67 has a generally rounded lateral cross-section, as is illustrated in FIG. 5. If shaft portion 51 of push rod 50 is allowed to shift out of axial alignment relative to bore 32, tangs 66 and 66' may engage the sides of slot 67 at varying depths of slot 67 where the slot width is either wider or narrower. Such axial misalignment of push rod 50 will result in either a decrease or an increase in the angle of rotation of actuating member 28 necessary to take up the lost motion clearance between tangs 66 and 66' and the sides of slot 67. Furthermore, if push rod 50 shifts so as to be axially misaligned in a lateral direction relative to slot 67, one of the tangs 66 and 66' may engage the side of slot 67 before the other tang, causing premature adjustment of the brake. As a result of such axial misalignment, the brake will either adjust inconsistently in response to different amounts of friction element wear, or adjust prematurely, depending upon the amount and direction of misalignment of push rod 50.

To ensure consistent automatic brake adjustment, bushing 56 is preferably located on shaft portion 51 of push rod 50 inboard of clutch springs 55 and 55', as is illustrated in FIG. 3. Bushing 56 maintains shaft portion 51 of push rod 50 in an axially concentric position relative to bore 32, as is shown in FIG. 6. Thus when the brake is applied, both tangs 66 and 66' engage the sides of slot 67 together at a consistent depth of slot 67, thereby resulting in consistent and predictable performance of the brake's automatic adjusting mechanism.

Manual adjustment of the brake may be performed by inserting a torque tool into the inboard end of bore 32 of actuating member 28 to engage torque-transmitting surface 64. Push rod 50 may then be rotated manually to adjust the brake or to retract push rod 50 to allow installation of new friction elements during brake maintenance.

The foregoing descriptions represent merely exemplary embodiments of the present invention. Various changes may be made in the arrangements and details of production of the embodiments shown and described without departing from the spirit and scope of the present invention.

We claim:

1. A mechanically-actuated disc brake, including a rotor, rotatable about an axis, having a pair of friction surfaces, one on each side thereof, friction element means in juxtaposed relation with each of said rotor friction surfaces, a housing having a bore extending axially therethrough, brake-applying means within said bore for urging said friction element means into engagement with said rotor friction surfaces, said brake-applying means including a cam assembly in juxtaposed relation with said bore, said cam assembly including a rotatable and a nonrotatable cam member defining a gap therebetween, a push rod communicating with said friction element means, said push rod having a threaded portion thereof coaxially positioned within, and circumscribed by, said cam assembly, said nonrotatable cam member threadably engaging said threaded portion of said push rod, whereby upon normal brake actuating rotation of said rotatable cam member, the combination of said nonrotatable cam member and said push rod axially translates in a forward brake-applying direction urging said push rod into direct engagement with said friction element means thereby effecting frictional engagement of said friction element means with said rotor friction surface, means for biasing the combination of said nonrotatable cam member and said push rod in a rearward brake-releasing direction upon counter rotation of said rotatable cam member, adjusting means for rotating said push rod relative to said nonrotatable cam member, thereby forwardly advancing said push rod with respect to said nonrotatable cam member, said adjusting means including clutch means for rotating said push rod with respect to said nonrotatable cam member in response to rotation of said rotatable cam member, said clutch means including a one-way spring clutch frictionally circumscribing said push rod and including at least one external tang projecting radially outward and engaging an axially-extending slot in said rotatable cam member, the circumferential width of said axially-extending slot in said rotatable cam member being greater than the circumferential width of said external tang whereby said one-way spring clutch slips and rotates with respect to said push rod after a predetermined rotation of said rotatable cam member in a first rotary direction and drivingly rotates said push rod relative to said nonrotatable cam member in response to counter-rotation of said rotatable cam member in a second rotary direction, thereby indexing said push rod in said forward axial direction to maintain the clearance between said friction elements and said rotor, a one-way spring brake having a portion extending into said gap circumscribingly and threadingly engaging a threaded portion of said push rod extending into said gap, whereby said one-way spring brake frictionally engages threads in said gap, one end of said one-way spring brake being rotationally fixed to said nonrotatable cam member, thereby allowing said push rod to rotate in said second rotary direction so as to forwardly index said push rod and frictionally resisting rotation of said push rod in said first rotary direction.

2. The mechanically-actuated disc brake according to claim 1, further comprising an annular bushing juxtaposed within said rotatable cam member and circumscribing said push rod, whereby said push rod is maintained in coaxial alignment within said rotatable cam member.

3. The mechanically-actuated disc brake according to claim 2, wherein said rotatable cam member includes a rearwardly-protruding shaft having a hollow axial passageway therethrough and wherein said adjusting means includes means for manually rotating said push rod with respect to said nonrotatable cam member, whereby said push rod is selectively advanced in said forward direction, or retracted in said rearward direction, relative to said nonrotatable cam member, said manual means including torque-transmitting means on an end of said push rod, whereby a torque tool may be inserted through said axial passageway in said shaft to engage said torque-transmitting means and rotate said push rod with respect to said nonrotatable cam member, thereby selectively advancing or retracting said push rod.

* * * * *